United States Patent
Meng et al.

(10) Patent No.: US 11,991,487 B2
(45) Date of Patent: May 21, 2024

(54) METHOD, SYSTEM, AND COMPUTER-READABLE MEDIUM FOR IMPROVING COLOR QUALITY OF IMAGES

(71) Applicant: GUANGDONG OPPO MOBILE TELECOMMUNICATIONS CORP., LTD., Guangdong (CN)

(72) Inventors: Zibo Meng, Palo Alto, CA (US); Chiuman Ho, Palo Alto, CA (US)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 415 days.

(21) Appl. No.: 17/537,389

(22) Filed: Nov. 29, 2021

(65) Prior Publication Data

US 2022/0086410 A1    Mar. 17, 2022

Related U.S. Application Data

(63) Continuation of application No. PCT/CN2019/122413, filed on Dec. 2, 2019.

(60) Provisional application No. 62/855,426, filed on May 31, 2019.

(51) Int. Cl.
*G06K 9/00* (2022.01)
*G06T 3/40* (2006.01)
(Continued)

(52) U.S. Cl.
CPC .............. *H04N 9/646* (2013.01); *G06T 3/40* (2013.01); *G06T 5/70* (2024.01); *G06T 7/90* (2017.01);
(Continued)

(58) Field of Classification Search
CPC . H04N 9/646; G06T 3/40; G06T 2207/20084; G06T 7/90; G06N 3/045
See application file for complete search history.

(56) References Cited

U.S. PATENT DOCUMENTS

2019/0019311 A1* 1/2019 Hu .......................... G06N 3/084
2019/0122394 A1   4/2019 Shen et al.
(Continued)

FOREIGN PATENT DOCUMENTS

| CN | 109190752 A | 1/2019 |
|---|---|---|
| CN | 109242788 A | 1/2019 |
| CN | 109410129 A | 3/2019 |

OTHER PUBLICATIONS

Chen Chen et al.: "Learning to See in the Dark", Eye In-Painting With Exemplar Generative Adversarial Networks, Jun. 1, 2018 (Jun. 1, 2018), pp. 3291-3300.

(Continued)

*Primary Examiner* — Andrew M Moyer
*Assistant Examiner* — Aidan Keup
(74) *Attorney, Agent, or Firm* — Young Basile Hanlon & MacFarlane, P.C.

(57) ABSTRACT

In an embodiment, a method includes receiving and processing a first color image by an encoder. The first color image includes a first portion of the first color image and a second portion of the first color image located at different locations of the first color image. The encoder is configured to output at least one first feature map including fused global information and local information such that whether a color consistency relationship between the first portion of the first color image and the second portion of the first color image exists is encoded into the fused global information and local information.

19 Claims, 3 Drawing Sheets

(51) Int. Cl.
*G06T 5/70* (2024.01)
*G06T 7/90* (2017.01)
*H04N 9/64* (2023.01)

(52) U.S. Cl.
CPC .............. *G06T 2207/10024* (2013.01); *G06T 2207/20084* (2013.01); *G06T 2207/20221* (2013.01)

(56) References Cited

U.S. PATENT DOCUMENTS

2020/0265567 A1\* 8/2020 Hu ............................ G06T 5/50
2022/0036523 A1\* 2/2022 Moran ................... G06N 20/00

OTHER PUBLICATIONS

Ronneberger Olaf et al: "U-Net: Convolutional Networks for Biomedical Image Segmentation : 18th International Conference, Munich, Germany, Oct. 5-9, 2015, Proceedings, Part III" In: "Computervision—ECCV 2020 : 16th European conference, Glasgow, UK, Aug. 23-28, 2020 : proceedings", May 18, 2015 (May 18, 2015), Springer International Publishing, Cham, vol. 9351, pp. 234-241.
European Search Report for EP Application No. 19930636.6, mailed Jun. 27, 2022 (9 pages).
GLADNet: Low-Light Enhancement Network with Global Awareness,2018 13th IEEE International Conference on Automatic Face & Gesture Recognition (5 pages).
International Search Report with English Translation of PCT/CN2019/122413 mailed Mar. 12, 2020 (10 pages).

\* cited by examiner

METHOD, SYSTEM, AND COMPUTER-READABLE MEDIUM FOR IMPROVING COLOR QUALITY OF IMAGES

CROSS-REFERENCE TO RELATED APPLICATION(S)

The present application is a continuation-application of International (PCT) Patent Application PCT/CN2019/122413, filed on Dec. 2, 2019, which claims a priority to U.S. Patent Application No. 62/855,426, filed on May 31, 2019, the entire contents of both of which are herein incorporated by reference.

TECHNICAL FIELD

The present disclosure relates to the field of image processing, and more particularly, to a method, system, and computer-readable medium for improving color quality of images.

BACKGROUND

When images are captured under, for example, low-light conditions or underwater conditions, it may be hard to identify content of the image due to a low signal-to-noise ratio (SNR), low contrast, and/or a narrow dynamic range. Image denoising techniques remove image noise. Image enhancement techniques improve perceptual qualities such as contrast of images. Image denoising techniques and/or image enhancement techniques aim at providing images with saturated colors and fruitful details albeit being taking under, for example, low-light conditions or underwater conditions.

Figure 1:
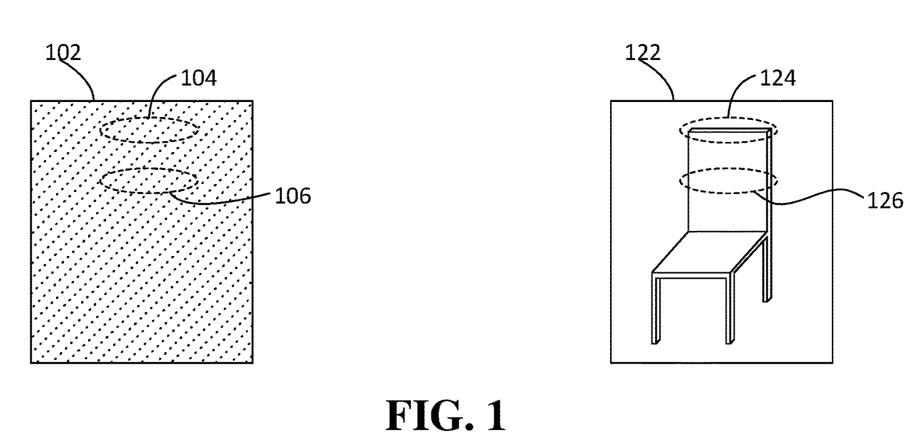
FIG. 1 is a diagram schematically illustrating an input color image and an output color image of an encoder-decoder network of the related art.

In the related art described in "Learning to see in the dark," C. Chen, Q. Chen, J. Xu, V. Koltun, In CVPR, 2018, an encoder-decoder network SID-net performs image denoising and/or enhancement on an input color image, to generate an output color image. The encoder-decoder network SID-net includes an encoder and a decoder. The encoder extracts features of the input color image, to obtain an abstract representation with color information. In order to obtain the output color image, the color information of the abstract representation needs to be restored by the decoder. FIG. 1 is a diagram schematically illustrating an input color image 102 and an output color image 122 of the encoder-decoder network SID-net of the related art. Referring to FIG. 1, the input color image 102 has a chair which is hard to identify due to a low SNR, low contrast, and/or a narrow dynamic range. A first portion 104 of the input color image 102 is an edge of a back of the chair, and a second portion 106 of the input color image 102 is an inner portion of the back of the chair. Although the edge of the back of the chair actually has a same color as the inner portion of the back of the chair, when color information of an abstract representation is restored by the decoder, a first portion 124 of an output color image 122 corresponding to the first portion 104 of the input color image 102 and a second portion 126 of the output color image 122 corresponding to the second portion 106 of the input color image 102 may have inconsistent colors. Color inconsistency between the edge of the back of the chair and the inner portion of the back of the chair in the output color image 122 is represented by the edge of the back of the chair drawn using a dashed line style. This color inconsistency situation is known as halo. Other color inconsistency situations similar to halo such as spotted also exist for the related art.

SUMMARY

An object of the present disclosure is to propose a method, system, and computer-readable medium for improving color quality of an image.

In a first aspect of the present disclosure, a computer-implemented method includes: receiving and processing a first color image by an encoder. The first color image includes a first portion of the first color image and a second portion of the first color image located at different locations of the first color image. The encoder is configured to output at least one first feature map including fused global information and local information such that whether a color consistency relationship between the first portion of the first color image and the second portion of the first color image exists is encoded into the fused global information and local information. The encoder includes: a first block; a second block; and a first skip connection. The first block includes: a convolutional block configured to output at least one second feature map including local information and has a first receptive field. The second block includes: a global pooling layer configured to perform global pooling on the at least one second feature map, and output at least one third feature map including global information, and has a second receptive field wider than the first receptive field; and the upscaling layer configured to upscale the at least one third feature map and output at least one fourth feature map having a same scale as the at least one second feature map and including the global information. The first skip connection is configured to fuse the at least one second feature map and the at least one fourth feature map, to generate the at least one first feature map, such that the at least one first feature map has a same number of channels as a number of channels of the at least one second feature map. The fused global information and local information is obtained from the global information and the local information.

In a second aspect of the present disclosure, a system includes at least one memory and at least one processor. The at least one memory is configured to store program instructions. The at least one processor is configured to execute the program instructions, which cause the at least one processor to perform steps including: receiving and processing a first color image by an encoder. The first color image includes a first portion of the first color image and a second portion of the first color image located at different locations of the first color image. The encoder is configured to output at least one first feature map including fused global information and local information such that whether a color consistency relationship between the first portion of the first color image and the second portion of the first color image exists is encoded into the fused global information and local information. The encoder includes: a first block; a second block; and a first skip connection. The first block includes: a convolutional block configured to output at least one second feature map including local information and has a first receptive field. The second block includes: a global pooling layer configured to perform global pooling on the at least one second feature map, and output at least one third feature map including global information, and has a second receptive field wider than the first receptive field; and an upscaling layer configured to upscale the at least one third feature map and output at least one fourth feature map having a same scale as the at least one second feature map and including the global information. The first skip connection is configured to fuse the at least one second feature map and the at least one fourth feature map, to generate the at least one first feature map, such that the at least one first feature map has a same number of channels as a number of channels of the at least one second feature map. The fused global information and local information is obtained from the global information and the local information.

In a third aspect of the present disclosure, a non-transitory computer-readable medium with program instructions stored thereon is provided. When the program instructions are executed by at least one processor, the at least one processor is caused to perform steps including: receiving and processing a first color image by an encoder. The first color image includes a first portion of the first color image and a second portion of the first color image located at different locations of the first color image. The encoder is configured to output at least one first feature map including fused global information and local information such that whether a color consistency relationship between the first portion of the first color image and the second portion of the first color image exists is encoded into the fused global information and local information. The encoder includes: a first block; a second block; and a first skip connection. The first block includes: a convolutional block configured to output at least one second feature map including local information and has a first receptive field. The second block includes: a global pooling layer configured to perform global pooling on the at least one second feature map, and output at least one third feature map including global information, and has a second receptive field wider than the first receptive field; and an upscaling layer configured to upscale the at least one third feature map and output at least one fourth feature map having a same scale as the at least one second feature map and including the global information. The first skip connection is configured to fuse the at least one second feature map and the at least one fourth feature map, to generate the at least one first feature map, such that the at least one first feature map has a same number of channels as a number of channels of the at least one second feature map. The fused global information and local information is obtained from the global information and the local information.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

As used here, the term "using" refers to a case in which an object is directly employed for performing a step, or a case in which the object is modified by at least one intervening step and the modified object is directly employed to perform the step.

Figure 2:
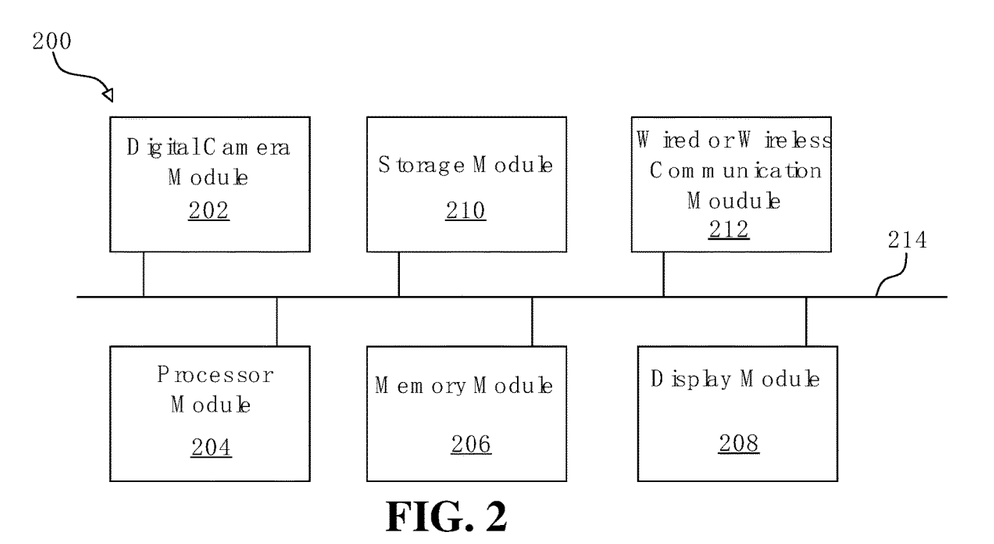
FIG. 2 is a block diagram illustrating inputting, processing, and outputting hardware modules in a terminal in accordance with an embodiment of the present disclosure.

FIG. 2 is a block diagram illustrating inputting, processing, and outputting hardware modules in a terminal 200 in accordance with an embodiment of the present disclosure. Referring to FIG. 2, the terminal 200 includes a digital camera module 202, a processor module 204, a memory module 206, a display module 208, a storage module 210, a wired or wireless communication module 212, and buses 214. The terminal 200 may be cell phones, smartphones, tablets, notebook computers, desktop computers, or any electronic device having enough computing power to perform image processing.

The digital camera module 202 is an inputting hardware module and is configured to capture an input color image $I_1$ (labeled in FIG. 3) that is to be transmitted to the processor module 204 through the buses 214. The input color image $I_1$ may be a raw image with pixels arranged in a Bayer pattern. Alternatively, the input color image $I_1$ may be obtained using another inputting hardware module, such as the storage module 210, or the wired or wireless communication module 212. The storage module 210 is configured to store an input color image $I_1$ that is to be transmitted to the processor module 204 through the buses 214. The wired or wireless communication module 212 is configured to receive an input color image $I_1$ from a network through wired or wireless communication, wherein the input color image $I_1$ is to be transmitted to the processor module 204 through the buses 214.

When the input color image is captured, for example, under a low-light condition or an underwater condition, or with an insufficient amount of exposure time, it may be hard to identify content of the input color image due to a low signal-to-noise ratio (SNR), low contrast, and/or a narrow dynamic range. The memory module 206 may be a transitory or non-transitory computer-readable medium that includes at least one memory storing program instructions that, when executed by the processor module 204, cause the processor module 204 to process the input color image $I_1$. The processor module 204 is configured as an encoder-decoder network 300 (shown in FIG. 3) that performs image denoising and/or enhancement on the input color image $I_1$ and generate an output color image $I_2$ (labeled in FIG. 3). The processor module 204 includes at least one processor that sends signals directly or indirectly to and/or receives signals directly or indirectly from the digital camera module 202, the memory module 206, the display module 208, the storage module 210, and the wired or wireless communication module 212 via the buses 214. The at least one processor may be central processing unit(s) (CPU(s)), graphics processing unit(s) (GPU(s)), and/or digital signal processor(s) (DSP(s)). The CPU(s) may send the input color image $I_1$, some of the program instructions and other data or instructions to the GPU(s), and/or DSP(s) via the buses 214.

The display module 208 is an outputting hardware module and is configured to display the output color image $I_2$ that is received from the processor module 204 through the buses 214. Alternatively, the output color image $I_2$ may be output using another outputting hardware module, such as the storage module 210, or the wired or wireless communication module 212. The storage module 210 is configured to store the output color image $I_2$ that is received from the processor module 204 through the buses 214. The wired or wireless communication module 212 is configured to transmit the output color image $I_2$ to the network through wired or wireless communication, wherein the output color image $I_2$ is received from the processor module 204 through the buses 214.

The terminal 200 is one type of system all of components of which are integrated together by the buses 214. Other types of computing systems such as a system that has a remote digital camera module instead of the digital camera module 202 are within the contemplated scope of the present disclosure.

Figure 3:
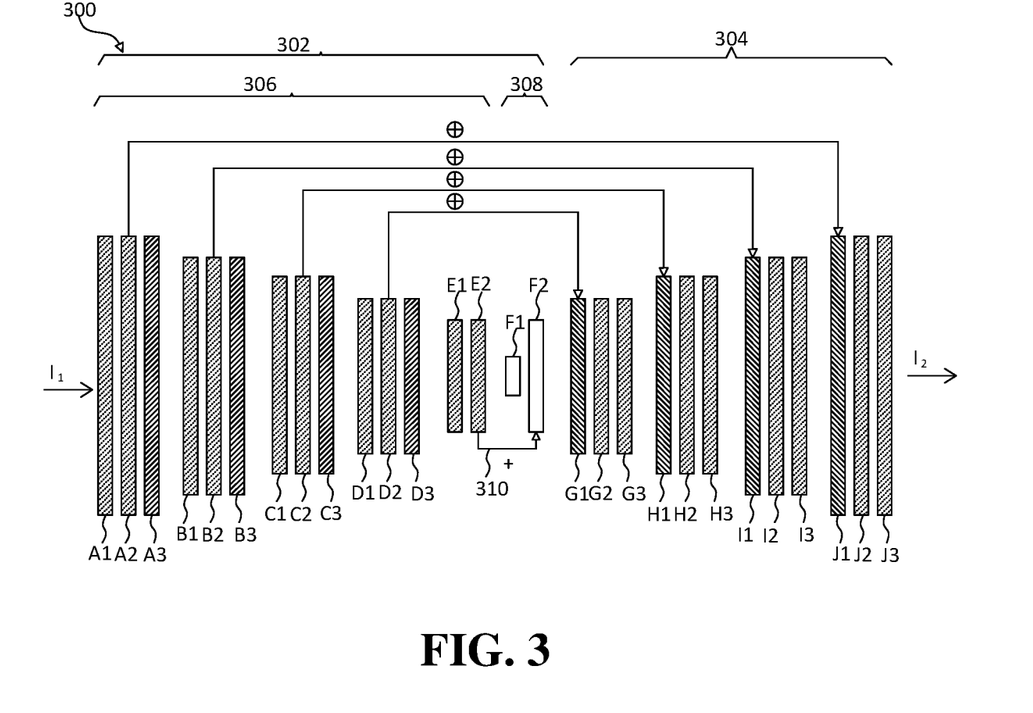
FIG. 3 is a diagram illustrating an encoder-decoder network for image denoising and/or enhancement in accordance with an embodiment of the present disclosure.

FIG. 3 is a diagram illustrating an encoder-decoder network 300 for image denoising and/or enhancement in accordance with an embodiment of the present disclosure. Given an input image I, the encoder-decoder network 300 learns a mapping I'=f(I:w) that renders the input image I denoised and/or enhanced, to generate an output image I', where w is a set of learnable parameters of the encoder-decoder network 300. The encoder-decoder network 300 with learned parameters performs image denoising and/or enhancement on the input color image $I_1$, to generate the output color image $I_2$.

The encoder-decoder network 300 includes an encoder 302 and a decoder 304. The encoder 302 extracts features of the input color image $I_1$, to obtain an abstract representation with color information. In order to obtain the output color image $I_2$, the color information of the abstract representation needs to be restored by the decoder 304.

Referring to FIG. 3, in an embodiment, the encoder-decoder network 300 has a U-net architecture. The encoder 302 is configured to output at least one first feature map including fused global information and local information such that whether a color consistency relationship between a first portion of the input color image $I_1$ and a second portion of the input color image $I_1$ exists is encoded into the fused global information and local information. The first portion of the input color image $I_1$ and the second portion of the input color image $I_1$ are located at different locations of the input color image $I_1$. In an embodiment, the at least one first feature map is a multi-channel feature map. The encoder 302 includes a first block 306, a second block 308, and a skip connection 310. The first block 306 includes a plurality of stages A to E. Each of the stages A to E includes a convolutional block X1 and a convolutional block X2 following the convolutional block X1, wherein X is any of A to E. Each of the stages A to D further includes a pooling layer X3 following the convolutional block X2, wherein X is any of A to D. In an embodiment, each of the convolutional blocks X1 and X2 includes a 3×3 convolutional layer. Other kernel sizes of the convolutional layers of the convolutional blocks X1 and X2 are within the contemplated scope of the present disclosure. Each of the convolutional blocks X1 and X2 further includes a nonlinear activation function following the 3×3 convolutional layer. In an embodiment, the nonlinear activation function is a Leaky ReLU operation. In an embodiment, the pooling layer X3 is a max pooling layer. Alternatively, the pooling layer X3 is an average pooling layer. In the first block 306, scales decrease stage by stage from the stage A to the stage D, so a scale of the at least one first feature map is smaller than a scale of the input color image $I_1$. A number of channels increases stage by stage from the stage A to the stage E, so a number of channels of the at least one first feature map is more than a number of channels of the input color image $I_1$.

The convolutional block E2 is configured to output at least one second feature map including local information. The convolutional block E2 has a first receptive field. That is, the 3×3 convolutional layer of the convolutional block E2 has the first receptive field.

The second block 308 includes a global pooling layer F1 and an upscaling layer F2. The global pooling layer F1 is configured to perform global pooling on the at least one second feature map, and output at least one third feature map including global information. The global pooling layer F1 has a second receptive field wider than the first receptive field. In an embodiment, the global pooling layer F1 is a global max pooling layer. Alternatively, the global pooling layer F1 is a global average pooling layer. The upscaling layer F2 is configured to upscale the at least one third feature map and output at least one fourth feature map having a same scale as the at least one second feature map and including the global information. In an embodiment, because the input color image $I_1$ has an arbitrary scale, if the upscaling layer F2 is a deconvolutional layer, a stride of the deconvolutional layer is dynamic, which is undesirable. Thus, the upscaling layer F2 is an upsampling layer free of learnable parameters, such as an upsampling layer that performs a bilinear upsampling operation, a linear upsampling operation, a bicubic upsampling operation, or a nearest upsampling operation on the at least one third feature map. In an embodiment, the upscaling layer F2 is an upsampling layer that performs a bilinear upsampling operation on the at least one third feature map.

The skip connection 310 is configured to fuse the at least one second feature map and the at least one fourth feature map, to generate the at least one first feature map, such that the at least one first feature map has a same number of channels as a number of channels of the at least one second feature map. In an embodiment, the first skip connection is configured to fuse the at least one second feature map and the at least one fourth feature map by performing an element-wise summation operation on the at least one second feature map and the at least one fourth feature map. Alternatively, an element-wise averaging operation instead of the element-wise summation operation is performed. The fused global information and local information in the at least one first feature map is obtained from the local information in the at least one second feature map and the global information in the at least one fourth feature map.

The decoder 304 is configured to output the output color image $I_2$ generated from the at least one first feature map, wherein a first portion of the output color image $I_2$ corresponding to the first portion of the input color image $I_1$ and a second portion of the output color image $I_2$ corresponding to the second portion of the input color image $I_1$ are restored considering whether the color consistency relationship between the first portion of the input color image $I_1$ and the second portion of the input color image $I_1$ exists. In an embodiment, the output color image $I_2$ is an RGB image. The decoder 304 includes a plurality of stages G to J. Each of the stages G to J includes an upscaling layer X1, a convolutional block X2 following the upscaling layer X1, and a convolutional block X3 following the convolutional block X2, wherein X is any of G to J. In an embodiment, the upscaling layer X1 is an upsampling layer that performs, for example, a linear upsampling operation, a bilinear upsampling operation, a bicubic upsampling operation, or a nearest upsampling operation. Alternatively, the upscaling layer X1 is a deconvolutional layer. In an embodiment, each of the convolutional blocks X2 and X3 includes a 3×3 convolutional layer. Other kernel sizes of the convolutional layers of the convolutional blocks X2 and X3 are within the contemplated scope of the present disclosure. Each of the convolutional blocks X2 and X3 further includes a nonlinear activation function following the 3×3 convolutional layer. In an embodiment, the nonlinear activation function is a Leaky ReLU operation. Scales increase stage by stage from the stage G to the stage J, so a scale of the output color image $I_2$ is larger than the scale of the at least one first feature map. A number of channels decreases stage by stage from the stage G to the stage J, so a number of channels of the output color image $I_2$ is fewer than the number of channels of the at least one first feature map.

In the above embodiment, the encoder-decoder network 300 has the U-net architecture. Other architectures such as an encoder-decoder network having a substantially same scale throughout an encoder and a decoder are within the contemplated scope of the present disclosure.

Figure 4:
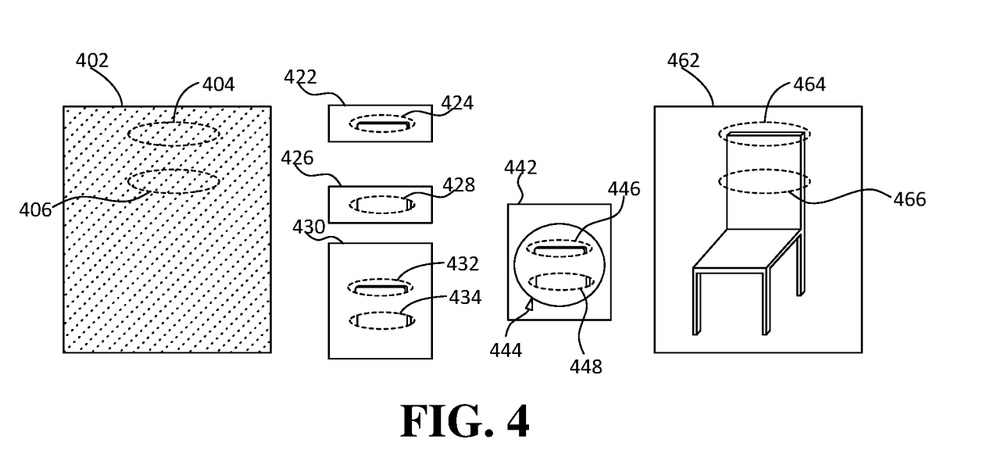
FIG. 4 is a diagram schematically illustrating an input color image, an output color image, and intermediate details for color restoration performed by the encoder-decoder network in accordance with an embodiment of the present disclosure.

FIG. 4 is a diagram schematically illustrating an input color image 402, an output color image 462, and intermediate details for color restoration performed by the encoder-decoder network 300 in accordance with an embodiment of the present disclosure. Referring to FIGS. 3 and 4, the input color image 402 has a chair with a plain back. The chair in the input color image 402 is hard to identify due to a low SNR, low contrast, and/or a narrow dynamic range. A first portion 404 of the input color image 402 is an edge of a back of the chair, and a second portion 406 of the input color image 402 is an inner portion of the back of the chair. The encoder 302 is configured to output at least one first feature map 442 including fused global information and local information such that whether a color consistency relationship between the first portion 404 of the input color image 402 and the second portion 406 of the input color image 402 exists is encoded into the fused global information and local information.

When the first portion 404 of the input color image 402 and the second portion 406 of the input color image 402 are being extracted by the encoder 302 for features, the convolutional block E2 considers the first portion 404 of the input color image 402 directly or indirectly in a view 422 with a size of a first receptive field, which is represented by a portion 424 being processed by the view 422. The convolutional block E2 considers the second portion 406 of the input color image 402 directly or indirectly in a view 426 with the size of the first receptive field, which is represented by a portion 428 being processed by the view 426. For simplicity, in the examples in FIGS. 4 and 5, only at least one portion being processed, which corresponds to at least one of the first portion 404 of the input color image 402 and the second portion 406 of the input color image 402, in a view is shown, and the other portion being processed in the view are not shown. When each of the first portion 404 of the input color image 402 and the second portion 406 of the input color image 402 is considered in the corresponding view 422 or 426, no semantics attributed to any of the first portion 404 of the input color image 402 and the second portion 406 of the input color image 402 is encoded into local information in at least one second feature map output by the convolutional block E2.

When the first portion 404 of the input color image 402 and the second portion 406 of the input color image 402 are being extracted by the encoder 302 for features, the global pooling layer F1 considers both of the first portion 404 of the input color image 402 and the second portion 406 of the input color image 402 directly or indirectly in a view 430 with a size of a second receptive field, which is represented by a portion 432 being processed and a portion 434 being processed covered by the view 430. When both of the first portion 404 of the input color image 402 and the second portion 406 of the input color image 402 are considered in the view 430, a semantics, i.e. a "back of the chair" 444, attributed to the first portion 404 of the input color image 402 and the second portion 406 of the input color image 402 is encoded into global information in at least one third feature map output by the global pooling layer F1. The upscaling layer F2 outputs at least one fourth feature map including the global information.

The skip connection 310 fuses the at least one second feature map and the at least one fourth feature map, to generate the at least one first feature map 442 including the fused global information and local information. The fused global information and local information is obtained from the local information and the global information. Because no semantics attributed to the first portion 404 of the input color image 402 and the second portion 406 of the input color image 402 is encoded into the fused global information and local information, and the semantics, i.e. the "back of the chair" 444, attributed to the first portion 404 of the input color image 402 and the second portion 406 of the input color image 402 is encoded into the fused global information and local information, the color consistency relationship exists between the first portion 404 of the input color image 402 and the second portion 406 of the input color image 402. The existence of the color consistency relationship is illustrated by, in the at least one first feature map 442, a portion 446 corresponding to the first portion 404 of the input color image 402 and a portion 448 corresponding to the second portion 406 of the input color image 402 being circled together by the semantics, i.e. the "back of the chair" 444, but not being individually circled.

The decoder 304 is configured to output an output color image 462 generated from the at least one first feature map 442, wherein a first portion 464 of the output color image 462 corresponding to the first portion 404 of the input color image 402 and a second portion 466 of the output color image 462 corresponding to the second portion 406 of the input color image 402 are restored considering whether the color consistency relationship between the first portion 404 of the input color image 402 and the second portion 406 of the input color image 402 exists. In the example in FIG. 4, because the color consistency relationship exists between the first portion 404 of the input color image 402 and the second portion 406 of the input color image 402, the first portion 464 of the output color image 462 and the second portion 466 of the output color image 462 are restored to have a same color. Color consistency between the edge of the back of the chair and the inner portion of the back of the chair in the output color image 462 is represented by the edge of the back of the chair drawn using a solid line style.

Figure 5:
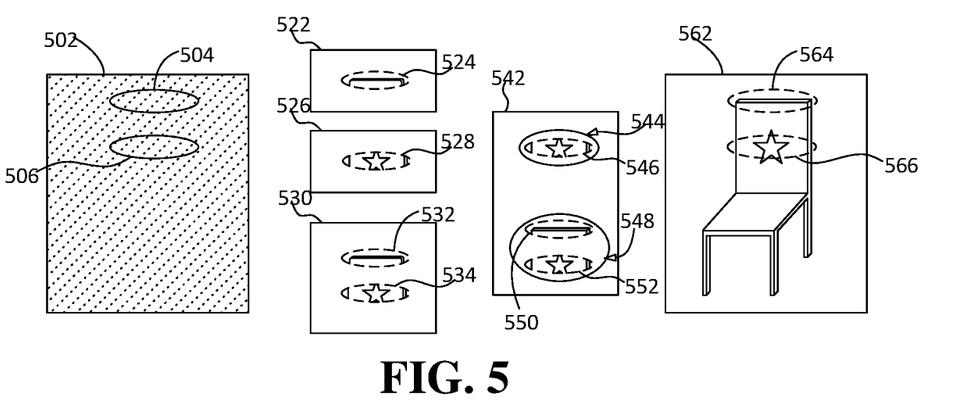
FIG. 5 is a diagram schematically illustrating another input color image, another output color image, and other intermediate details for color restoration performed by the encoder-decoder network in accordance with an embodiment of the present disclosure.

FIG. 5 is a diagram schematically illustrating an input color image 502, an output color image 562, and intermediate details for color restoration performed by the encoder-decoder network 300 in accordance with an embodiment of the present disclosure. Referring to FIGS. 3 and 5, the input color image 502 has a chair with a back decorated with a star. The chair in the input color image 502 is hard to identify due to a low SNR, low contrast, and/or a narrow dynamic range. A first portion 504 of the input color image 502 is an edge of a back of the chair, and a second portion 506 of the input color image 502 is an inner portion of the back of the chair with the decorated star. The encoder 302 is configured to output at least one first feature map 542 including fused global information and local information such that whether a color consistency relationship between the first portion 504 of the input color image 502 and the second portion 506 of the input color image 502 exists is encoded into the fused global information and local information.

When the first portion 504 of the input color image 502 and the second portion 506 of the input color image 502 are being extracted by the encoder 302 for features, the convolutional block E2 considers the first portion 504 of the input color image 502 directly or indirectly in a view 522 with a size of a first receptive field, which is represented by a portion 524 being processed by the view 522. The convolutional block E2 considers the second portion 506 of the input color image 502 directly or indirectly in a view 526 with the size of the first receptive field, which is represented by a portion 528 being processed by the view 526. When the first portion 504 of the input color image 502 is considered in the view 522, no semantics attributed to the first portion 504 of the input color image 502 is encoded into local information in at least one second feature map output by the convolutional block E2. When the second portion 506 of the input color image 502 is considered in the view 526, a semantics, i.e. a "star" 544, attributed to the second portion 506 of the input color image 502 is encoded into the local information in the at least one second feature map.

When the first portion 504 of the input color image 502 and the second portion 506 of the input color image 502 are being extracted by the encoder 302 for features, the global pooling layer F1 considers both of the first portion 504 of the input color image 502 and the second portion 506 of the input color image 502 directly or indirectly in a view 530 with a size of a second receptive field, which is represented by a portion 532 being processed and a portion 534 being processed covered by the view 530. When both of the first portion 504 of the input color image 502 and the second portion 506 of the input color image 502 are considered in the view 530, a semantics, i.e. a "back of the chair" 548, attributed to the first portion 504 of the input color image 502 and the second portion 506 of the input color image 502 is encoded into global information in at least one third feature map output by the global pooling layer F1. The upscaling layer F2 outputs at least one fourth feature map including the global information.

The skip connection 310 fuses the at least one second feature map and the at least one fourth feature map, to generate the at least one first feature map 542 including the fused global information and local information. The fused global information and local information is obtained from the local information and the global information. Because the semantics, i.e. the "star" 544, attributed to the second portion 506 of the input color image 502 is encoded into the fused global information and local information, and the semantics, i.e. the "back of the chair" 548, is encoded into the fused global information and local information, the color consistency relationship does not exist between the first portion 504 of the input color image 502 and the second portion 506 of the input color image 502. The nonexistence of the color consistency relationship is illustrated by, in the at least one first feature map 542, a portion 546 corresponding to the second portion 506 of the input color image 502 being individually circled by the semantics, i.e. the "star" 544, and a portion 550 corresponding to the first portion 504 of the input color image 502 and a portion 552 corresponding to the second portion 506 of the input color image 502 being circled together by the semantics, i.e. the "back of the chair" 548.

The decoder 304 is configured to output an output color image 562 generated from the at least one first feature map 442, wherein a first portion 564 of the output color image 562 corresponding to the first portion 504 of the input color image 502 and a second portion 566 of the output color image 562 corresponding to the second portion 506 of the input color image 502 are restored considering whether the color consistency relationship between the first portion 504 of the input color image 502 and the second portion 506 of the input color image 502 exists. In the example in FIG. 5, because the color consistency relationship does not exist between the first portion 504 of the input color image 502 and the second portion 506 of the input color image 502, the first portion 564 of the output color image 562 and the second portion 566 of the output color image 562 are restored to have different colors. Color inconsistency between the edge of the back of the chair and the decorated star portion of the back of the chair in the output color image 562 due to fine details reflected locally is represented by the edge of the back of the chair drawn using the solid line style and the star drawn using a dashed line style.

In addition, referring to FIG. 3, in an embodiment, feature maps output by the upscaling layer G1 of the decoder 304 and the convolutional block D2 of the encoder 302 have a substantially same scale. Similarly, feature maps of the upscaling layer H1 and the convolutional block C2, feature maps of the upscaling layer I1 and the convolutional block B2, and feature maps of the upscaling layer J1 and the convolutional block A2 have substantially same corresponding scales. The feature maps of the upscaling layer G1 and the convolutional block D2 are concatenated together and input to the convolutional block G2. Similarly, the feature maps of the upscaling layer H1 and the convolutional block C2, the feature maps of the upscaling layer I1 and the convolutional block B2, and the feature maps of the upscaling layer J1 and the convolutional block A2 are correspondingly concatenated together and correspondingly input to the convolutional blocks H2, I2, and J2.

Furthermore, in an embodiment, during training, the input color image $I_1$ of the encoder-decoder network 300 is a short-exposure color image captured under, for example, a low-light condition or an underwater condition. A loss function is calculated between the output color image $I_2$ of the encoder-decoder network 300 and a ground-truth image which is a corresponding long-exposure color image. The loss function is a weighted joint loss of $\ell_1$ and a multi-scale structured similarity index (MS-SSIM), which is defined by equation (1):

$$\mathcal{L} = \lambda \mathcal{L}^{\ell_1} + (1-\lambda) \mathcal{L}^{MS\text{-}SSIM} \qquad (1),$$

where $\lambda$ is set to 0.16 empirically, $\mathcal{L}^{\ell_1}$ is the $\ell_1$ loss defined by equation (2), and $\mathcal{L}^{MS\text{-}SSIM}$ represents an MS-SSIM loss given by equation (3). Equation (2) is as follows:

$$\mathcal{L}^{\ell_1} = \frac{1}{N} \sum_{i \in I} |I(i) - \hat{I}(i)|, \qquad (2)$$

where $\hat{I}$ and $I$ are the output color image $I_2$ and the ground-truth image, respectively, and N is the total number of pixels in the input color image $I_1$. Equation (3) is as follows:

$$\mathcal{L}^{MS\text{-}SSIM} = 1 - MS\text{-}SSIM \qquad (3),$$

where MS-SSIM for pixel i is defined by equations (4)-(6). Equations (4)-(6) are as follows:

$$MS - SSIM(i) = l_M^{\alpha}(i) \cdot \prod_{j=1}^{M} cs_j^{\beta_j}(i) \qquad (4)$$

-continued $$l(i) = \frac{2\mu_x\mu_y + C_1}{\mu_x^2 + \mu_y^2 + C_1} \quad (5)$$

$$cs(i) = \frac{2\sigma_{xy} + C_2}{\sigma_x^2 + \sigma_y^2 + C_2}, \quad (6)$$

where x and y represent two discrete non-negative signals that have been aligned with each other (e.g. two image patches extracted from a same spatial location from two images being compared, respectively); $\mu_x$ and $\mu_y$ are means, $\sigma_x$ and $\sigma_y$ are standard deviations, M is the number of levels, and $\alpha$ and $\beta$ are the weights to adjust the contribution of each component. The means $\mu_x$ and $\mu_y$, and the standard deviations $\sigma_x$ and $\sigma_y$ are calculated with a Gaussian filter, $G_g$, with zero mean and a standard deviation $\sigma_g$.

Table 1, below, illustrates experimental results that may be achieved by the embodiments described with reference to FIGS. 3 to 5. Referring to FIG. 3, by employing the global pooling layer F1, the upscaling layer F2, and the skip connection 310, the fused global information and local information indicating whether the color consistency relationship between the first portion of the input color image $I_1$ and the second portion of the first color image $I_2$ exists is generated. The fused global information and local information may indicate that the color consistency relationship exists in the situation described with reference to FIG. 4. Therefore, color inconsistency for the situation described with reference to FIG. 1 caused by a receptive field at a bottleneck of the encoder-decoder network SID-net not sufficiently large to cover the first portion 104 of the input color image 102 and the second portion 106 of the input color image 102 may be resolved. The fused global information and local information may indicate that the color consistency relationship does not exist in the situation described with reference to FIG. 5, and therefore, color consistency balance may be achieved. Hence, performance such as a peak signal to noise ratio (PSNR) of the output color image $I_2$ may be improved. Furthermore, by using the skip connection 310 that fuses the at least one second feature map and the at least one fourth feature map, to generate the at least one first feature map, such that the at least one first feature map has the same number of channels as the number of channels of the at least one second feature map, the PSNR of the output color image $I_2$ is improved without introducing extra learnable parameters to the encoder-decoder network 300. Table 1 illustrates image denoising and enhancement for the embodiments described with reference to FIGS. 3 to 5, as compared to the encoder-decoder network SID-net described by "Learning to see in the dark," C. Chen, Q. Chen, J. Xu, V. Koltun, In CVPR, 2018. Both the embodiments described with reference to FIGS. 3 to 5, and the encoder-decoder network SID-net may be run in the system described with reference to FIG. 2. As shown, compared to the encoder-decoder network SID-net, the embodiments described with reference to FIGS. 3 to 5 may achieve 3.5% increase in a PSNR with a number of learnable parameters being same as the encoder-decoder network SID-net.

TABLE 1

Results of Comparison on Image Denoising and Enhancement

| | PSNR | Number of Learnable Parameters |
| --- | --- | --- |
| SID-net | 28.6 | 7,760,268 |
| embodiments described with reference to FIGS. 3 to 5 | 29.6 | 7,760,268 |

A person having ordinary skill in the art understands that each of the units, modules, layers, blocks, algorithm, and steps of the system or the computer-implemented method described and disclosed in the embodiments of the present disclosure are realized using hardware, firmware, software, or a combination thereof. Whether the functions run in hardware, firmware, or software depends on the condition of application and design requirement for a technical plan. A person having ordinary skill in the art can use different ways to realize the function for each specific application while such realizations should not go beyond the scope of the present disclosure.

It is understood that the disclosed system, and computer-implemented method in the embodiments of the present disclosure can be realized with other ways. The above-mentioned embodiments are exemplary only. The division of the modules is merely based on logical functions while other divisions exist in realization. The modules may or may not be physical modules. It is possible that a plurality of modules are combined or integrated into one physical module. It is also possible that any of the modules is divided into a plurality of physical modules. It is also possible that some characteristics are omitted or skipped. On the other hand, the displayed or discussed mutual coupling, direct coupling, or communicative coupling operate through some ports, devices, or modules whether indirectly or communicatively by ways of electrical, mechanical, or other kinds of forms.

The modules as separating components for explanation are or are not physically separated. The modules are located in one place or distributed on a plurality of network modules. Some or all of the modules are used according to the purposes of the embodiments.

If the software function module is realized and used and sold as a product, it can be stored in a computer readable storage medium. Based on this understanding, the technical plan proposed by the present disclosure can be essentially or partially realized as the form of a software product. Or, one part of the technical plan beneficial to the conventional technology can be realized as the form of a software product. The software product is stored in a computer readable storage medium, including a plurality of commands for at least one processor of a system to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program instructions.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A computer-implemented method, comprising:
  receiving and processing a first color image by an encoder,
  wherein
  the first color image comprises a first portion of the first color image and a second portion of the first color image located at different locations of the first color image; and
  the encoder is configured to output at least one first feature map comprising fused global information and local information such that whether a color consistency relationship between the first portion of the first color image and the second portion of the first color image exists is encoded into the fused global information and local information, wherein the encoder comprises:
a first block;
a second block; and
a first skip connection,
wherein
the first block comprises:
a convolutional block configured to output at least one second feature map comprising local information and has a first receptive field; and
the second block comprises:
a global pooling layer configured to perform global pooling on the at least one second feature map, and output at least one third feature map comprising global information, and has a second receptive field wider than the first receptive field; and
an upscaling layer configured to upscale the at least one third feature map and output at least one fourth feature map having a same scale as the at least one second feature map and comprising the global information; and
the first skip connection is configured to fuse the at least one second feature map and the at least one fourth feature map, to generate the at least one first feature map, such that the at least one first feature map has a same number of channels as a number of channels of the at least one second feature map, wherein the fused global information and local information is obtained from the global information and the local information.

2. The computer-implemented method of claim 1, wherein the first block causes a scale of the at least one first feature map to be smaller than a scale of the first color image.

3. The computer-implemented method of claim 1, wherein
when the convolutional block considers each of the first portion of the first color image and the second portion of the first color image in a corresponding first view with a size of the first receptive field, no semantics attributed to any of the first portion of the first color image and the second portion of the first color image is encoded into the local information; and
when the global pooling layer considers both of the first portion of the first color image and the second portion of the first color image in a second view with a size of the second receptive field, a first semantics attributed to the first portion of the first color image and the second portion of the first color image is encoded into the global information, whereby the color consistency relationship between the first portion of the first color image and the second portion of the first color image exists.

4. The computer-implemented method of claim 1, wherein
when the convolutional block considers one of the first portion of the first color image and the second portion of the first color image in a first view with a size of the first receptive field, a first semantics attributed to the one of the first portion of the first color image and the second portion of the first color image is encoded into the local information; and
when the global pooling layer considers both of the first portion of the first color image and the second portion of the first color image in a second view with a size of the second receptive field, a second semantics attrib-
uted to the first portion of the first color image and the second portion of the first color image is encoded into the global information, whereby the color consistency relationship between the first portion of the first color image and the second portion of the first color image does not exist.

5. The computer-implemented method of claim 1, wherein the upscaling layer is an upsampling layer free of learnable parameters.

6. The computer-implemented method of claim 5, wherein the upsampling layer is configured to upscale the at least one third feature map by performing a bilinear upsampling operation on the at least one third feature map.

7. The computer-implemented method of claim 1, wherein the first skip connection is configured to fuse the at least one second feature map and the at least one fourth feature map by performing an element-wise summation operation on the at least one second feature map and the at least one fourth feature map.

8. The computer-implemented method of claim 1, further comprising:
receiving and processing the at least one first feature map by a decoder, wherein the decoder is configured to output a second color image generated from the at least one first feature map, wherein a first portion of the second color image corresponding to the first portion of the first color image and a second portion of the second color image corresponding to the second portion of the first color image are restored considering whether the color consistency relationship between the first portion of the first color image and the second portion of the first color image exists, wherein the decoder comprises a plurality of convolutional blocks.

9. The computer-implemented method of claim 8, wherein the decoder causes a scale of the second color image to be larger than a scale of the at least one first feature map.

10. A system, comprising:
at least one memory configured to store program instructions;
at least one processor configured to execute the program instructions, which cause the at least one processor to perform steps comprising:
receiving and processing a first color image by an encoder,
wherein
the first color image comprises a first portion of the first color image and a second portion of the first color image located at different locations of the first color image; and
the encoder is configured to output at least one first feature map comprising fused global information and local information such that whether a color consistency relationship between the first portion of the first color image and the second portion of the first color image exists is encoded into the fused global information and local information, wherein the encoder comprises:
a first block;
a second block; and
a first skip connection,
wherein
the first block comprises:
a convolutional block configured to output at least one second feature map comprising local information and has a first receptive field;

the second block comprises:
a global pooling layer configured to perform global pooling on the at least one second feature map, and output at least one third feature map comprising global information, and has a second receptive field wider than the first receptive field; and
an upscaling layer configured to upscale the at least one third feature map and output at least one fourth feature map having a same scale as the at least one second feature map and comprising the global information; and
the first skip connection is configured to fuse the at least one second feature map and the at least one fourth feature map, to generate the at least one first feature map, such that the at least one first feature map has a same number of channels as a number of channels of the at least one second feature map, wherein the fused global information and local information is obtained from the global information and the local information.

11. The system of claim 10, wherein the first block causes a scale of the at least one first feature map to be smaller than a scale of the first color image.

12. The system of claim 10, wherein
when the convolutional block considers each of the first portion of the first color image and the second portion of the first color image in a corresponding first view with a size of the first receptive field, no semantics attributed to any of the first portion of the first color image and the second portion of the first color image is encoded into the local information; and
when the global pooling layer considers both of the first portion of the first color image and the second portion of the first color image in a second view with a size of the second receptive field, a first semantics attributed to the first portion of the first color image and the second portion of the first color image is encoded into the global information, whereby the color consistency relationship between the first portion of the first color image and the second portion of the first color image exists.

13. The system of claim 10, wherein
when the convolutional block considers one of the first portion of the first color image and the second portion of the first color image in a first view with a size of the first receptive field, a first semantics attributed to the one of the first portion of the first color image and the second portion of the first color image is encoded into the local information; and
when the global pooling layer considers both of the first portion of the first color image and the second portion of the first color image in a second view with a size of the second receptive field, a second semantics attributed to the first portion of the first color image and the second portion of the first color image is encoded into the global information, whereby the color consistency relationship between the first portion of the first color image and the second portion of the first color image does not exist.

14. The system of claim 10, wherein the upscaling layer is an upsampling layer free of learnable parameters.

15. The system of claim 14, wherein the upsampling layer is configured to upscale the at least one third feature map by performing a bilinear upsampling operation on the at least one third feature map.

16. The system of claim 10, wherein the first skip connection is configured to fuse the at least one second feature map and the at least one fourth feature map by performing an element-wise summation operation on the at least one second feature map and the at least one fourth feature map.

17. The system of claim 10, wherein the steps further comprises:
receiving and processing the at least one first feature map by a decoder, wherein the decoder is configured to output a second color image generated from the at least one first feature map, wherein a first portion of the second color image corresponding to the first portion of the first color image and a second portion of the second color image corresponding to the second portion of the first color image are restored considering whether the color consistency relationship between the first portion of the first color image and the second portion of the first color image exists.

18. The system of claim 17, wherein the decoder causes a scale of the second color image to be larger than a scale of the at least one first feature map.

19. A non-transitory computer-readable medium with program instructions stored thereon, that when executed by at least one processor, cause the at least one processor to perform steps comprising:
receiving and processing a first color image by an encoder,
wherein
the first color image comprises a first portion of the first color image and a second portion of the first color image located at different locations of the first color image; and
the encoder is configured to output at least one first feature map comprising fused global information and local information such that whether a color consistency relationship between the first portion of the first color image and the second portion of the first color image exists is encoded into the fused global information and local information, wherein the encoder comprises:
a first block;
a second block; and
a first skip connection,
wherein
the first block comprises:
a convolutional block configured to output at least one second feature map comprising local information and has a first receptive field;
the second block comprises:
a global pooling layer configured to perform global pooling on the at least one second feature map, and output at least one third feature map comprising global information, and has a second receptive field wider than the first receptive field; and
an upscaling layer configured to upscale the at least one third feature map and output at least one fourth feature map having a same scale as the at least one second feature map and comprising the global information; and
the first skip connection is configured to fuse the at least one second feature map and the at least one fourth feature map, to generate the at least one first feature map, such that the at least one first feature map has a same number of channels as a number of channels of the at least one second feature map, wherein the fused global information and local information is obtained from the global information and the local information.

\* \* \* \* \*